United States Patent
Boese

(10) Patent No.: US 11,205,185 B2
(45) Date of Patent: *Dec. 21, 2021

(54) FORECASTING DEMAND FOR GROUPS OF ITEMS, SUCH AS MOBILE PHONES

(71) Applicant: T-Mobile USA, Inc., Bellevue, WA (US)

(72) Inventor: Mike Boese, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/730,026

(22) Filed: Dec. 30, 2019

(65) Prior Publication Data

US 2020/0134649 A1    Apr. 30, 2020

Related U.S. Application Data

(63) Continuation of application No. 15/344,408, filed on Nov. 4, 2016, now Pat. No. 10,521,810.

(Continued)

(51) Int. Cl.
   *G06Q 30/02*    (2012.01)
   *G06Q 10/08*    (2012.01)

(52) U.S. Cl.
   CPC ....... *G06Q 30/0202* (2013.01); *G06Q 10/087* (2013.01)

(58) Field of Classification Search
   CPC .................. G06Q 10/087; G06Q 30/0202
   See application file for complete search history.

(56) References Cited

U.S. PATENT DOCUMENTS

| | | | |
|---|---|---|---|
| 10,521,810 B2 | 12/2019 | Boese | |
| 2006/0173728 A1* | 8/2006 | An | G06Q 10/08 705/7.22 |

(Continued)

FOREIGN PATENT DOCUMENTS

| | | | | |
|---|---|---|---|---|
| CA | 2982060 A1 * | 4/2018 | ......... | G06Q 30/0283 |
| CA | 2982060 A1 | 4/2018 | | |

OTHER PUBLICATIONS

Mark Dekker et. al., "How to use aggregation and combined forecasting to improve seasonal demand forecasts," Feb. 6, 2004, International Journal of Production Economics, vol. 90, pp. 151-167 (Year: 2004).*

(Continued)

*Primary Examiner* — Amanda Gurski
(74) *Attorney, Agent, or Firm* — Perkins Coie LLP

(57) ABSTRACT

In some embodiments, the systems and methods obtain parameters for a set of mobile devices (or, other items), such as volume information, price information, and perceived value information for each mobile device within the set of mobile devices. The set of mobile devices may be a tier of substitute mobile devices that each affect consumer demand of other mobile devices within the set of mobile devices. The systems and methods may then determine substitution factors for the obtained parameters associated with the set of mobile devices, generate a substitution forecast for the set of mobile devices that is based on the substitution factors determined for the obtained parameters associated with the mobile devices, and determine a consensus forecast for the set of mobile devices that adjusts a baseline forecast for the demand of the set of mobile devices using the substitution forecast.

20 Claims, 17 Drawing Sheets

Related U.S. Application Data

(60) Provisional application No. 62/252,398, filed on Nov. 6, 2015, provisional application No. 62/316,450, filed on Mar. 31, 2016.

(56) References Cited

U.S. PATENT DOCUMENTS

| | | | |
|---|---|---|---|
| 2009/0234710 A1* | 9/2009 | Belgaied Hassine | ........................ G06Q 30/0206 705/7.29 |
| 2017/0116653 A1* | 4/2017 | Smith | .................... G06Q 10/06 |

OTHER PUBLICATIONS

Dekker, Mark et al. "How to use aggregation and combined forecasting to improve seasonal demand forecasts," Feb. 6, 2004, International Journal of Production Economics, vol. 90, pp. 151-167.

* cited by examiner

| | Device 1 | Device 2 | Device 3 | Device 4 | Device 5 | Device 6 | Device 7 |
|---|---|---|---|---|---|---|---|
| Volume | 3000 | 4000 | 12000 | 14000 | 6000 | 12000 | 9000 |
| Price | $49 | $89 | $139 | $99 | $149 | $229 | $289 |
| Perceived Value (PV) | 2 | 4 | 6 | 7 | 6.5 | 8 | 9 |
| Baseline Forecast | 3000 | 4000 | 12000 | 14000 | 6000 | 12000 | 9000 |

| Volume Out | Core Device |
|---|---|
| Device 1 3000 | 3000/(46000-14000) = 0.065 |
| Device 2 4000 | 4000/(46000-14000) = 0.087 |
| Device 3 12000 | 12000/(46000-14000) = 0.261 |
| Device 4 14000 | 0 |
| Device 5 6000 | 6000/(46000-14000) = 0.130 |
| Device 6 12000 | 12000/(46000-14000) = 0.261 |
| Device 7 9000 | 9000/(46000-14000) = 0.196 |

VOLUME BASED SUBSTITUTION FACTOR MATRIX

FIG. 4A

| Price Out | Core Device |
|---|---|
| Device 1 $49 | (1/abs(99-49))/(0.177995) = 0.112 |
| Device 2 $89 | (1/abs(99-89))/(0.177995) = 0.562 |
| Device 3 $139 | (1/abs(99-139))/(0.177995) = 0.140 |
| Device 4 $99 | 0 |
| Device 5 $149 | (1/abs(99-149))/(0.177995) = 0.112 |
| Device 6 $229 | (1/abs(99-229))/(0.177995) = 0.043 |
| Device 7 $289 | (1/abs(99-289))/(0.177995) = 0.03 |

PRICE BASED SUBSTITUTION FACTOR MATRIX

| PV Out | Core Device |
|---|---|
| Device 1<br>2 | (1/abs(7-2))/(5.033) = 0.04 |
| Device 2<br>4 | (1/abs(7-4))/(5.033) = 0.066 |
| Device 3<br>6 | (1/abs(7-6))/(5.033) = 0.199 |
| Device 4<br>7 | 0 |
| Device 5<br>6.5 | (1/abs(7-6.5))/(5.033) = 0.397 |
| Device 6<br>8 | (1/abs(7-8))/(5.033) = 0.199 |
| Device 7<br>9 | (1/abs(7-9))/(5.033) = 0.099 |

PERCEIVED VALUE (PV) SUBSTITUTION FACTOR MATRIX

| Out | Core Volume | Core Price | Core PV | Core Combined Factor |
|---|---|---|---|---|
| Device 1 | 0.065 | 0.112 | 0.04 | 0.074 |
| Device 2 | 0.087 | 0.562 | 0.066 | 0.225 |
| Device 3 | 0.261 | 0.140 | 0.199 | 0.212 |
| Device 4 | 0 | 0 | 0 | 0 |
| Device 5 | 0.130 | 0.112 | 0.397 | 0.178 |
| Device 6 | 0.261 | 0.043 | 0.199 | 0.183 |
| Device 7 | 0.196 | 0.03 | 0.099 | 0.127 |

COMBINED SUBSTITUTION FACTOR MATRIX

FIG. 5

| Out | Core Combined Factor | Substitution Forecast |
|---|---|---|
| Device 1 | 0.074 | -520 |
| Device 2 | 0.225 | -1577 |
| Device 3 | 0.212 | -1486 |
| Device 4 | 0 | 0 |
| Device 5 | 0.178 | -1249 |
| Device 6 | 0.183 | -1282 |
| Device 7 | 0.127 | -886 |

FIG. 6A

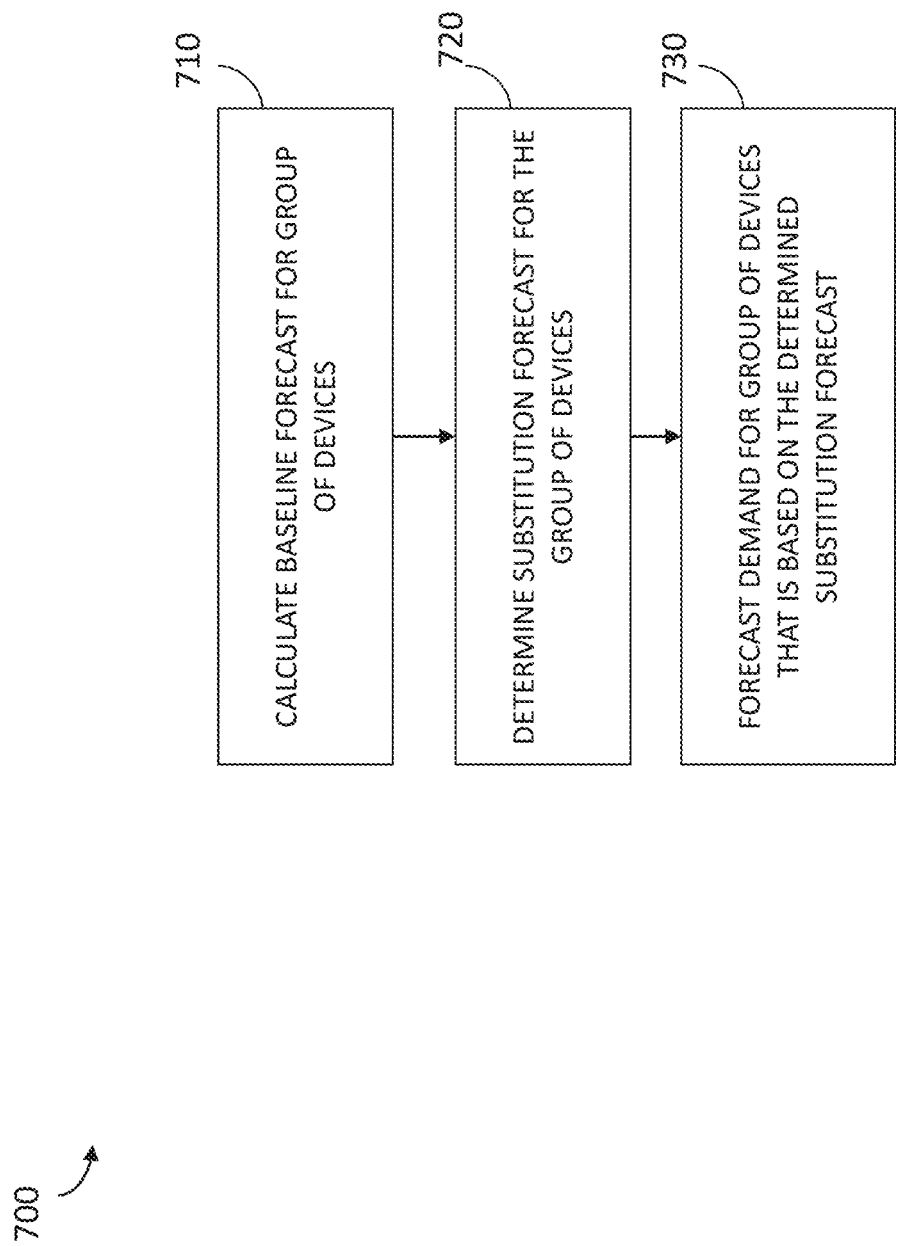

| | Sub Coefficient | Baseline Forecast | Substitution in (Unconstrained) | Unconstrained Sub Forecast | Forecast |
|---|---|---|---|---|---|
| Device 1 | 0.6 | 3000 | | -520 | 2480 |
| Device 2 | 0.8 | 4000 | | -1577 | 2423 |
| Device 3 | 0.6 | 12000 | | -1486 | 10514 |
| Device 4 | 0.7 | 14000 | 10000 | 0 | 24000 |
| Device 5 | 0.85 | 6000 | | -1249 | 4751 |
| Device 6 | 0.6 | 12000 | | -1282 | 10718 |
| Device 7 | 0.4 | 9000 | | -886 | 8114 |

FIG. 9

|  | Sub Coefficient | Forecast | Projected Inventory (Cycle1) | Forecast Reconciled (Cycle1) | Unsatisfied Demand (Cycle1) | Sub Out Cannibalized |
|---|---|---|---|---|---|---|
| Device 1 | 0.6 | 2480 | 50000 | 2480 | 0 | 0 |
| Device 2 | 0.8 | 2423 | 50000 | 2423 | 0 | 0 |
| Device 3 | 0.6 | 10514 | 50000 | 10514 | 0 | 0 |
| Device 4 | 0.7 | 24000 | 0 | 0 | 24000 | 16800 |
| Device 5 | 0.85 | 4751 | 50000 | 4751 | 0 | 0 |
| Device 6 | 0.6 | 10718 | 3000 | 3000 | 7718 | 4631 |
| Device 7 | 0.4 | 8114 | 50000 | 8114 | 0 | 0 |

FIG. 10A

| | Sub Out Cannibalized | Device4 Combined Matrix | Device4 Sub Quantity | Device6 Combined Matrix | Device6 Sub Quantity | Sub In |
|---|---|---|---|---|---|---|
| Device 1 | 0 | 0.074 | 1248 | 0.068 | 315 | 1563 |
| Device 2 | 0 | 0.225 | 3785 | 0.091 | 421 | 4206 |
| Device 3 | 0 | 0.212 | 3567 | 0.208 | 963 | 4529 |
| Device 4 | 16800 | 0.000 | 0 | 0.240 | 1110 | 1110 |
| Device 5 | 0 | 0.178 | 2997 | 0.162 | 748 | 3745 |
| Device 6 | 4631 | 0.183 | 3077 | 0.000 | 0 | 3077 |
| Device 7 | 0 | 0.127 | 2126 | 0.232 | 1074 | 3201 |

FIG. 10B

| | Projected Inventory (Cycle2) | Sub In Reconciled | Unsatisfied Demand | Sub Out Cannibalized |
|---|---|---|---|---|
| Device 1 | 47520 | 1563 | 0 | 0 |
| Device 2 | 47577 | 4206 | 0 | 0 |
| Device 3 | 39486 | 4529 | 0 | 0 |
| Device 4 | 0 | 0 | 1110 | 777 |
| Device 5 | 45249 | 3745 | 0 | 0 |
| Device 6 | 0 | 0 | 3077 | 1846 |
| Device 7 | 41886 | 3201 | 0 | 0 |

| | Sub Out Cannibalized | Device4 Combined Matrix | Device4 Sub Quantity | Device6 Combined Matrix | Device6 Sub Quantity | Sub In |
|---|---|---|---|---|---|---|
| Device 1 | 0 | 0.074 | 58 | 0.068 | 126 | 183 |
| Device 2 | 0 | 0.225 | 175 | 0.091 | 168 | 343 |
| Device 3 | 0 | 0.212 | 165 | 0.208 | 384 | 549 |
| Device 4 | 777 | 0.000 | 0 | 0.240 | 442 | 442 |
| Device 5 | 0 | 0.178 | 139 | 0.162 | 298 | 437 |
| Device 6 | 1846 | 0.183 | 142 | 0.000 | 0 | 142 |
| Device 7 | 0 | 0.127 | 98 | 0.232 | 428 | 527 |

FIG. 11B

|  | Projected Inventory (Final) | Sub In Reconciled (Cycle2) | Substitution Forecast |
|---|---|---|---|
| Device 1 | 45957 | 183 | 4226 |
| Device 2 | 43371 | 343 | 6972 |
| Device 3 | 34957 | 549 | 15592 |
| Device 4 | 0 | 0 | 0 |
| Device 5 | 41504 | 437 | 8933 |
| Device 6 | 0 | 0 | 3000 |
| Device 7 | 38685 | 527 | 11841 |

FIG. 12

FORECASTING DEMAND FOR GROUPS OF ITEMS, SUCH AS MOBILE PHONES

CROSS REFERENCE TO RELATED APPLICATIONS

This application is a continuation of U.S. patent application Ser. No. 15/344,408 filed Nov. 4, 2016, entitled FORECASTING DEMAND FOR GROUPS OF SUBSTITUTE ITEMS, SUCH AS MOBILE PHONES; which claims priority to U.S. Provisional Patent Application No. 62/252,398, filed on Nov. 6, 2015, entitled DEMAND AND SUBSTITUTION MODEL; and U.S. Provisional Patent Application No. 62/316,450 filed on Mar. 31, 2016, entitled FORECASTING INVENTORY FOR GROUPS OF SUBSTITUTE ITEMS, SUCH AS MOBILE PHONES; all of which are incorporated by reference in their entireties for all purposes.

BACKGROUND

Companies rely on practical and effective demand planning processes to create reliable forecasts associated with consumer demand for their products, such as mobile phones. Ideally, proper demand planning improves the accuracy of inventory and revenue forecasts, aligns inventory levels with peaks and troughs in demand, and helps to maximize the profitability of products and channels. Companies, therefore, strive to improve upon their current demand planning processes.

BRIEF DESCRIPTION OF THE DRAWINGS

Embodiments of the disclosed technology will be described and explained through the use of the accompanying drawings.

FIGS. 4A-C are diagrams illustrating example substitution factor matrices applied to information associated with a set of devices.

FIG. 5 is a diagram illustrating an example combined substitution factor matrix.

FIG. 6A is a diagram illustrating an example substitution forecast determined for a group of devices.

FIG. 7 is a flow diagram illustrating a method of forecasting demand for a group of substitutable items or devices.

FIG. 9 is a diagram illustrating a determination of an input forecast for a constrained demand forecast substitution determination.

FIGS. 10A-10B are diagrams illustrating various values determined during a first cycle of a constrained demand forecast substitution determination.

FIGS. 11A-11B are diagrams illustrating various values determined during a second cycle of a constrained demand forecast substitution determination.

FIG. 12 is a diagram illustrating the determination of a substitution forecast.

Figure 1:
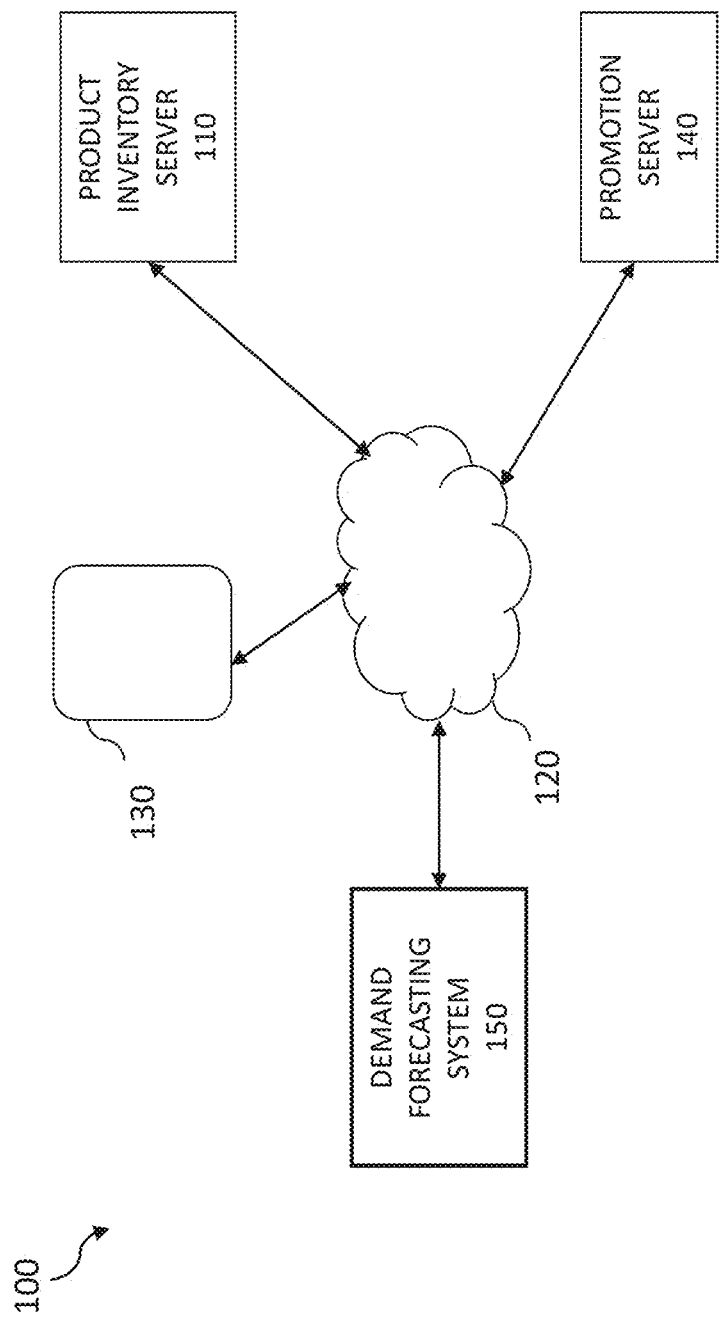
FIG. 1 is a block diagram illustrating a suitable computing environment within which to forecast demand for groups of items.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods for demand planning, including systems and methods that utilize demand and substitution models, processes, and/or algorithms, are described. For example, the systems and methods, via automated tools that utilize the models, may consider volume information, pricing information, and/or perceived value information as substitution parameters when modelling and/or automating cannibalization and stock out substitution, among other things, during demand planning for mobile devices, accessories, and other items.

In some embodiments, the systems and methods obtain parameters for a set of mobile devices, such as volume information, price information, and perceived value information for each mobile device within the set of mobile devices. The set of mobile devices may be a tier of substitute mobile devices that each affect consumer demand of other mobile devices within the set of mobile devices.

The systems and methods may then determine substitution factors for the obtained parameters associated with the set of mobile devices, generate a substitution forecast for the set of mobile devices that is based on the substitution factors determined for the obtained parameters associated with the mobile devices, and determine a consensus forecast for the set of mobile devices that adjusts a baseline forecast for the demand of the set of mobile devices using the substitution forecast.

Thus, in some embodiments, the systems and methods described herein may increase accuracy and functionality of a demand planning process, which may further standardize forecasting of item inventories and consumer demand with increased scale and flexibility, among other benefits.

The systems and methods, therefore, may determine the quantifiable parameters that have an impact on demand and customers' substitution preferences, build or utilize an automated tool that leverages advanced theoretical demand planning concepts while maintaining simple definitions and parameters that are practicable for implementation, in order to maximize and/or improve forecast accuracy and reduce time required to achieve an optimal or beneficial forecast, among other benefits.

In other words, the systems and methods described herein enhance conventional inventory and demand forecasting methods by quantifying consumer habits, preferences, prejudices and buying patterns (e.g., biases associated with prices and perceived values of similar devices) into specific algorithms, and then applying the algorithms to typical forecasting methods. These applications enable an entity to dynamically generate targeted demand forecasts for groups of substitute items, effectively changing and updating the processes of forecasting the consumer demand of physical items, such as mobile devices.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

FIG. 1 is a block diagram illustrating a suitable computing environment within which to forecast demand for groups of items, such as one or more tiers of substitutable items. A product inventory server 110 may store various information associated with items to be sold or offered to consumers. For example, the product inventory server may store items provided by a telecommunications carrier, such as various different types of mobile devices (e.g., smart phones, tablets, smart watches, and so on), device accessories (e.g., cases, covers, peripherals), and other similar items.

The product inventory server 110 may include databases that contain information for each of the devices, accessories, and other items, such as type information, make information, size information, color information, item specifications, fit information, form information, function information, and so on. Further, the databases may include information associated with current or projected inventory of items (e.g., volume information), information associated with current or projected retail pricing of items (e.g., price information), information associated with current or projected value of the items (e.g., perceived value or ranking information), and so on.

A user, such as an employee of a carrier associated with the product inventory server 110, may access the various databases via graphical user interfaces (GUIs) presented by the server 110 and displayed by a user device 120, in order to add information, modify or adjust information, and so on. The user device 130 may access the server 110 over a network 120, such as a telecommunications network, wireless network, storage area network, and so on. Further, a promotion server 140 may provide additional information associated with the inventory of items, such as information identifying current or future promotions for the items.

In some embodiments, a demand forecasting system 150 may access, via the network 120, the information stored at the product inventory server 110, in order to perform various demand planning processes, such as demand forecasting for the various substitutable items or products. Further details regarding the processes and components of the demand forecasting system 150 are described herein.

FIG. 1 and discussion herein provides a brief, general description of a suitable environment in which the demand and substitution systems and methods described herein may be implemented. Although not required, aspects of the invention are described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Examples of Determining Substitution Forecasts for Groups of Physical Items

Figure 2:
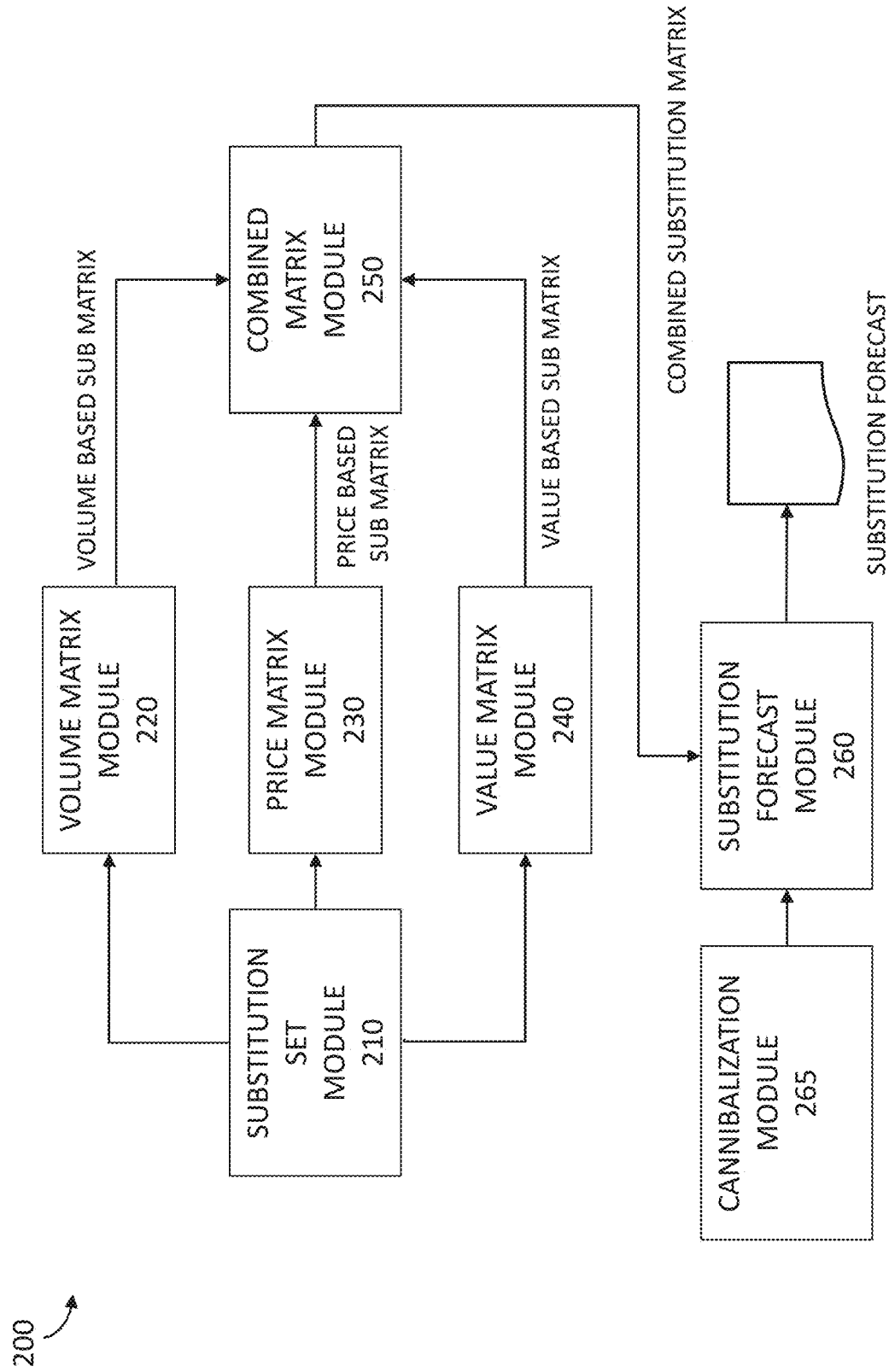
FIG. 2 is a data flow diagram illustrating the flow of data between components of a demand forecasting system.

As described herein, in some embodiments, the demand forecasting system 150 determines substitute forecasts for groups, sets, or tiers of substitutable items, and generates final or consensus demand forecasts for the items based on the determined substitute forecasts. In some cases, a set of substitutable items refers to a group of physical items whose sales affect one another. For example, a price change or stock out of any item in a substitution set will result in a change in a quantity sold of the remaining items in the set. FIG. 2 is a data flow diagram 200 illustrating the flow of data between components of the demand forecasting system 150. The demand forecasting system 150 may include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein. For example, the demand forecasting system 150 may include a substitution set module 210, various matrix modules (e.g., volume matrix module 220, price matrix module 230, value matrix module 240, and/or combined matrix module 250), a substitution forecast module 260, and a cannibalization module 265.

The substitution set module 210 is configured and/or programmed to obtain parameters for a set of items, such as a set of mobile devices, and provide the obtained information to various matrix modules. For example, the substitution set module 210 may obtain volume information, price information, perceived value information, and/or other information (fit, form, function information, such as color or appearance information) for each mobile device of the set of mobile device, such as a set of mobile devices that includes multiple substitutable mobile devices within the set of devices.

Figure 3:
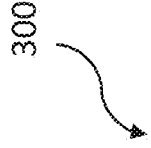
FIG. 3 is a diagram illustrating various information associated with a set of devices.

FIG. 3 is a diagram 300 that depicts various information fields or values associated with a set of devices, for a given week of demand of an "affordable" tier of substitutable devices.

The diagram illustrates example information that may be obtained for each of the devices, including volume information (e.g., "3000" for device 1 and "14000" for the device 4), price information (e.g., "$89" for device 2, and "$229" for device 6), perceived value information (e.g., "6" for device 3, and "8" for device 6), and baseline forecast information (e.g., at this point, is the same as the volume information).

The perceived value information may include or refer to a rating system from 1-10 (with 10 being the best) that indicates the perceived value of an item based on form, fit, functionality, and brand with respect to other items in a substitutable set of items. Various factors may influence the perceived value ranking. For example, for mobile devices, the perceived value of a device may be based on the brand, recent marketing/advertising campaign, operating system, design, screen size, RAM/ROM, camera mega-pixels, screen resolution, processor, unique features/newest technology, and so on.

One or more matrix modules receive the parameter information from the substitution set module 210 and determine substitution factors for the obtained parameters associated with the mobile devices within the set of the mobile devices. For example, volume information, price information, and perceived or real value information (e.g., "form," "fit," and "function") may capture or represent a customer substitution effect, and may be part of a combined substitution factor based on different weights assigned to the different types of information.

In some embodiments, the volume matrix module 220 is configured and/or programmed to generate a volume based substitution factor matrix that is based on the volume information for the set of mobile devices. In other words, the volume matrix module 220 may utilize the baseline forecast information at the channel/item level (e.g., for each of the mobile devices) to calculate or otherwise determine a volume based substitution factor for each item in a substitution set.

As shown in diagram 400 of FIG. 4A, the volume matrix module 220 generates a volume based substitution factor matrix having matrix values of volume based substitution factors, for each of the substitute mobile devices. The volume based substitution factors may reflect a cannibalization effect of one or more devices (e.g., "device 4, as depicted) within the substitution set on other devices. Thus, a volume based substitution factor for each device within the substitution set is determined as follows in this example:

volume based substitution factor=(volume amount of the substitute mobile device)/(total volume amount of set of mobile devices–volume amount of device 4).

For example, diagram 400 depicts device 1 to have a volume based substitution factor of 0.065, device 7 to have a volume based substitution factor of 0.196, and device 4 to have a volume based substitution factor of 0 (a device will not cannibalize its own volume).

In some embodiments, the price matrix module 230 is configured and/or programmed to generate a price based substitution factor matrix that is based on the price information for the set of mobile devices. In other words, the price matrix module 230 may utilize time-phased customer facing price information at the channel/item level (e.g., for each of the mobile devices) to calculate or otherwise determine a price based substitution factor for each item in a substitution set.

As shown in diagram 410 of FIG. 4B, the price matrix module 230 generates a price based substitution factor matrix having matrix values of price based substitution factors, for each of the substitute mobile devices. The price based substitution factors may reflect a cannibalization effect based on the prices of other devices within the substitution set. Thus, a price based substitution factor for each device within the substitution set is determined as follows in this example:

price based substitution factor=(1/abs(price of device 4–price of substitute mobile device)/(1/(price of device 4)*0.05), where the multiplier 0.05 (and other similar multipliers described herein is a flexible parameter set to group close prices to a common factor or value within the calculation. For example, diagram 410 depicts device 2 to have a price based substitution factor of 0.562, device 5 to have a price based substitution factor of 0.112, and device 7 to have a price based substitution factor of 0.03 (the greater the difference in prices, the smaller the cannibalization factor between devices, and vice versa).

In some embodiments, the value matrix module 240 is configured and/or programmed to generate a perceived value based substitution factor matrix that is based on the perceived value information for the set of mobile devices. In other words, the value matrix module 240 may utilize the time-phased perceived value (e.g., represented as comparative rankings, such as 1-10) at the channel/item level (e.g., for each of the mobile devices) to calculate or otherwise determine the perceived value substitution factor for each item in a substitution set.

As shown in diagram 420 of FIG. 4C, the value matrix module 240 generates a perceived value based substitution factor matrix having matrix values of perceived value based substitution factors, for each of the substitute mobile devices. The perceived value based substitution factors may represent a cannibalization effect that is based on the perceived values of other devices within the substitution set. Thus, a perceived value based substitution factor for each device within the substitution set is determined as follows in this example:

perceived value based substitution factor=(1/abs(perceived value of device 4–perceived value of substitute mobile device)/(1/(perceived value of device 4)*0.05).

For example, diagram 420 depicts device 3 to have a perceived value based substitution factor of 0.199, and depicts device 5 to have a perceived value based substitution factor of 0.397 (e.g., where the smaller the difference in perceived value, the larger the cannibalization factor between devices).

In some embodiments, the combined matrix module 250 is configured and/or programmed to generate a combined substitution factor matrix that is based on a weighted combination of values within the volume based substitution factor matrix, the price based substitution factor matrix, and the perceived value based substitution factor matrix. In other words, the combined matrix module 250 may apply different weights to the different factors to calculate or otherwise determine a combined or overall weighted substitution factor for each of the devices in the substitution set, which is used to determine substitution forecasts for devices.

As shown in diagram 500 of FIG. 5, the combined matrix module 250 generates a combined substitution factor matrix having matrix values of overall weighted substitution factors, for each of the substitute mobile devices. The combined or overall weighted based substitution factor for each device within the substitution set is determined as follows in this example:

Combined weighted substitution factor=
(weight$_{volume}$)(volume based substitution factor)+(weight$_{price}$)(price based substitution factor)+(weight$_{pv}$)(perceived value based substitution factor).

For example, given weight$_{volume}$=0.5, weight$_{price}$=0.3, and weight$_{pv}$=0.2, diagram 500 depicts device 1 to have a combined weighed substitution factor of 0.074, and depicts device 6 to have a combined weighed substitution factor of 0.183. Of course, other weights may be used to vary the different effects of the factors on the combined factor.

Thus, the various matrix modules determine substitution factors for different parameters associated with the substitution set of devices (or other items), including a combined (weighted) factor to be utilized when determining a substitution forecast for each device of the substitute set of devices.

Referring back to FIG. 2, the substitution forecast module 260 is configured and/or programmed to determine a substitution forecast for the set of mobile devices that is based on applying the combined substitution factor matrix to a determined amount of cannibalized devices for the substitution set.

The substitution forecast module 260, in some embodiments, receives information identifying the amount of cannibalized devices from the cannibalization module 265, which is configured and/or programmed to determine an amount of cannibalized units of the substitute set of devices (e.g., devices 1-7). The substitution forecast module 260, therefore, determines the substitution forecast for the set of mobile devices as a function of the amount of cannibalized units multiplied by a substitution forecast value obtained from the combined substitution factor matrix for each mobile device of the set of mobile devices.

The cannibalization module 265 may identify a percentage or level of increased demand of an item (e.g., because of price decrease or promotion of the item), and/or percentage or level of decreased demand of an item (e.g., because of price increase of the item), which would be cannibalized from the demand of other items in the substitution set (with the remaining percentage of items leading to an increase in the tier volume of overall items).

The cannibalization module 265, in some embodiments, generates a substitution coefficient that determines a cannibalization factor across all devices or accessories in a substitution set. The substitution coefficient may be based on various factors, including the perceived value substitution factor, and may be generated in a variety of ways.

For example, when an item first launches (e.g., an affordable tier device), a tier trend was 50,000 units. Post launch, the tier trend was 54,000 units and the device trend was 10,000 units, and the substitution coefficient as may be determined as 0.6=[1−(4000/10000)]. Thus, the substitution coefficient may be equal to [1−(Tier incremental volume)/item trend volume)].

As another example, the substitution coefficient may be based on comparisons between similar or substitutable items. For example, if an item in a tier has many similar items in terms of "price" and "perceived value," then it follows that the item will have a substitution factor closer to 1, but if an item in a tier has few similar items in terms of "price" and "perceived value," then it follows that the item will have a substitution factor closer to 0.

For example, if the cannibalization module 265 sets 0.8 (80%) as the cannibalization factor for an item, then 80% of the increased (or, decreased) demand will come at the cost of a decrease (or, increase) in the demand of other items in the set, and effectively only a 20% increase (or, decrease) in the tier volume, because of cannibalization of items within the substitution set. In addition, multiple devices may substitute the demand in a week or other time period. The substitution coefficient, therefore, represents, in the event of a stock out, the percentage of unsatisfied demand that will be transferred to the other items in the substitution set (where the remaining percentage is lost demand).

FIG. 6A is a diagram 600 illustrating an example substitution forecast determined for a group of devices. Given a promotion of the device 4 depicted in the diagram 600 (and other diagrams described herein), the overall demand of devices in the substitution set, including device 4, is predicted to be an additional 10,000 devices. The cannibalization module 265 determines a cannibalization factor or coefficient of 0.7 for device 4, and determines that 7000 devices (0.7*10,000 devices) will be cannibalized across the other devices within the substitution set, with the forecasted amounts for each device based on the combined substitution factors for the devices and the number of cannibalized devices.

For examples, as depicted in diagram 600, device 1 is determined to have a substitution forecast of −520 devices, where the substitution forecast is equal to the number of cannibalized devices (7000) multiplied by the combined substitution factor (0.074) for device 1, or (7000)(0.074)=518, which is rounded to 520 devices (the substitution factor taken only to three significant digits). The diagram 600 depicts the substitution forecasts for the other devices, which, when totaled equal 7000 devices, the number of total cannibalized devices. It also follows that the combined substitution factors for all the devices equals 1.0.

In some embodiments, a consensus forecast module (not shown) is configured and/or programmed to generate a consensus forecast for the inventory of the set of mobile devices that is based on a combination of a baseline forecast for the set of mobile devices, the promotion demand of the set of mobile devices, and/or the substitution forecast for the set of mobile devices.

Figure 6B:
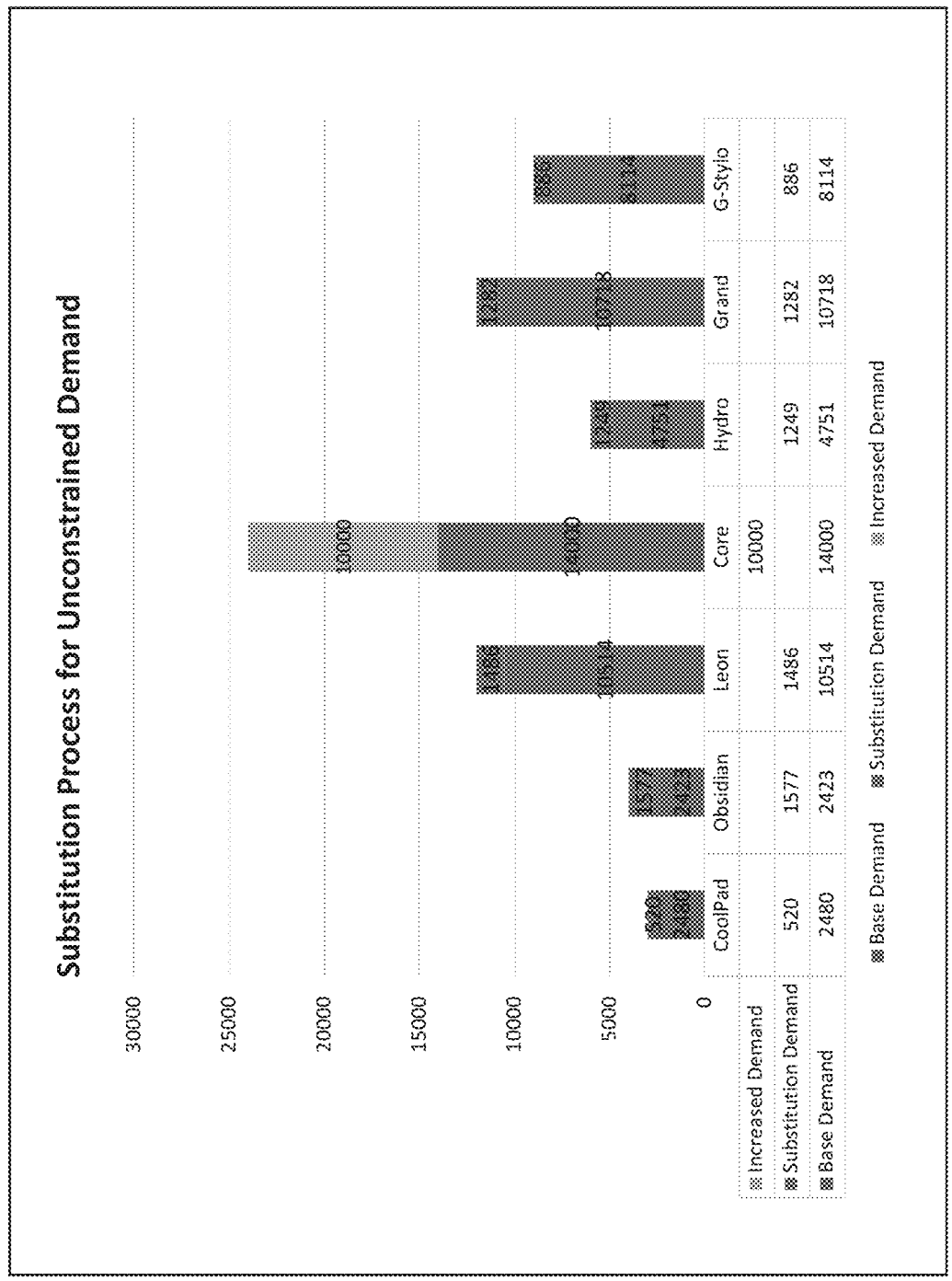
FIG. 6B is a diagram illustrating inventory demand forecast for a group of substitute devices.

FIG. 6B is a diagram 650 illustrating an inventory forecast for a substitute set of devices. As shown in diagram 650, for each of the devices, the overall or consensus forecast is a combination of a base demand for the device and a substitution demand for each of the devices that is based on the determined substitution forecasts for the devices.

As described herein, the demand forecasting system 150 performs various processes or operations in order to determine an accurate and reliable forecast of the demand for items (e.g., devices) within a substitution set of items. FIG. 7 is a flow diagram 700 illustrating a method of forecasting demand for a group of substitutable items or devices. The method 700 may be performed by the demand forecasting system 150 and, accordingly, is described herein merely by way of reference thereto. It will be appreciated that the method 700 may be performed on any suitable hardware.

In operation 710, the demand forecasting system 150 calculates a baseline forecast for a group of items (e.g., devices) For example, the demand forecasting system 150 may calculate a statistical forecast based on historical corrections or performances of similar items.

In operation 720, the demand forecasting system 150 determines substitution forecasts for the group of items. For example, the substitution forecast module 260 determines a substitution forecast for a set of mobile devices that is based on applying combined substitution factors to a determined amount of cannibalized devices for the substitution set of items, as described herein.

In operation 730, the demand forecasting system 150 generates a consensus or overall forecast for the group of items that is based on the baseline forecast and the substitution forecast. For example, the diagram 650 of FIG. 6B depicts a consensus forecast for a group of substitute devices.

The demand forecasting system 150 may perform other operations when generating the consensus or overall demand forecast. For example, the system 150 may utilize consumer or other user override information, substitution-in information, wherein quantities are increased/decreased, and so on.

Although the processes and methods described herein are directed to unconstrained demand scenarios, where there is a limitless, or theoretically limitless, supply of items available to consumers, the demand forecasting system 150 may utilize similar processes and methods when determining demand forecasts for items within constrained demand scenarios, where there is a limited supply of items available to consumers.

Figure 8:
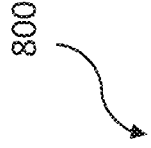
FIG. 8 is a diagram illustrating various information associated with a set of devices.

For example, FIG. 8 is a diagram 800 that depicts various information fields or values associated with a set of devices, for a given week of demand of an "affordable" tier of substitute devices, to be used in determining a constrained demand substitution forecast. The diagram 800 illustrates example information that may be obtained for each of the devices, including volume information (e.g., "3000" for device 1 and "14000" for device 4), price information (e.g., "$89" for device 2, and "$229" for device 6), perceived value information (e.g., "6" for device 3, and "8" for device 6), baseline forecast information, and substitution forecast information for unconstrained demand (e.g., "−520" for device 1), as determined following the methods described herein.

FIG. 9 depicts various assumptions when determining the constrained demand substitution forecast for the different devices. As shown in diagram 900, each device is assigned a substitution coefficient, a baseline forecast, an unconstrained substitution forecast (as determined herein), and a forecast (baseline forecast+unconstrained substitution forecast) that is used to calculate an impact of substitution due to an inventory shortage. This forecast acts as the input when determining substitution values under the constrained forecast.

FIGS. 10A-10B present diagrams 1000, 1050 that depict the determination of the substitution values in a first cycle (e.g., "Cycle1"). Although 2 cycles or iterations are described, the number of cycles may be determined based on user or system needs with respect to accuracy and precision of forecasting demand for items, and may be one, two, or several cycles.

As shown in diagram 1000, for each device, a forecast reconciled value is calculated as:

Forecast Reconciled=If Forecast(Check)>Projected Inventory(Cycle1), then "Projected Inventory (Cycle1)", else Forecast(Check).

Also, for each device, an unsatisfied demand value is calculated as:

Unsatisfied demand=If Forecast(Check)>Projected Inventory(Cycle1), then Forecast(Check)−Projected Inventory(Cycle1), else Zero(0).

Then, a Sub Out Cannibalized value of Unsatisfied Demand(Cycle1)*Substitution Coefficient is determined.

FIG. 10A, therefore, provides values for comparing the "Forecast(Check)" with user entered projected inventory for a week to match supply with the demand to identify "unsatisfied demand," where lack of inventory for an item may lead to increase in demand for other devices. In some cases, not all the unsatisfied demand will lead to increase in demand for other devices. Instead the "Unsatisfied demand*substitution coefficient" quantity will lead to cannibalization, as shown in the "Sub Out Cannibalized" field, which becomes the input for calculating the increase in quantities. The Forecast is matched with the supply to constrain the forecast in the field "Forecast Reconciled (Cycle1) Using the Sub Out Cannibalized field values, Substitution values, as depicted in diagram 1050, are determined. As shown, the Sub Oit Cannibalized units for device 4 and device 6 are applied to the respective combined matrix to determine the spread of cannibalized units across other devices in the substitution set. Then, the Sub Quantity units for each device are added to determine the Substitution units as output ("Sub In"). The Sub In values act as input for a second cycle (e.g., "Cycle2") to determine the impact of stock-out for other devices because of substitution.

FIGS. 11A-11B present diagrams 1100, 1150 that depict the determination of the substitution values in a first cycle (e.g., "Cycle1"). As shown in diagram 1100, Projected Inventory (Cycle2) is calculated by subtracting the Projected Inventory (Cycle1) with the Forecast Reconciled (Cycle1) for each device. Then, the Sub Out value for a device is matched with the Projected Inventory (Cycle2) to constrain quantity in the field "Sub Out Reconciled," as the lack of inventory for a device may lead to cannibalization of other devices in the Cycle2 set. As shown, not all the unsatisfied demand in Cycle2 may lead to increase in demand for other devices.

Thus, "Sub In Cannibalized" is determined as the "Unsatisfied demand" *"substitution coefficient," and is used for determining the increase in demand for other devices in Cycle2 using coefficient matrices. As shown in diagram 1150, the Sub Out Cannibalized units for device 4 and device 6 are applied to the respective combined matrix to determine the spread of cannibalized units across other devices in the substitution set. Then, the Sub Quantity units for each device are added to determine the Substitution In units, which becomes the input for calculating an overall constrained substitution forecast.

FIG. 12 is a diagram 1200 showing the determination of the substitution forecast for constrained demand of a group of devices. First, a Projected Inventory (Final) is determined by subtracting the Projected Inventory of Cycle2 with the Sub In values for each device, where the Sub In value of a device is matched with the Projected Inventory (Final) value to constrain the quantity in the field "Sub Out Reconciled." Then, the Substitution Forecast (Constrained) is determined as:

Substitution Forecast(Constrained)="Forecast Reconciled(Cycle1)"+"Sub In(1) Reconciled"+"Sub In(2) Reconciled".

Therefore, some embodiments, the methods and systems described herein facilitate the determination of substitution forecasts for device inventories under unconstrained demand scenarios and/or constrained demand scenarios.

Thus, in some embodiments, the demand forecasting system 150 determines forecasts for the demand of substitute sets of devices and other items based on substitution forecasts that are determined for each devices within the substitute set of devices. For example, the demand forecasting system 150 may forecast consumer demand for mobile devices within a group of substitute mobile devices by obtaining parameters for a set of mobile devices, where the obtained parameters includes volume information, price information, and perceived value information for each mobile device within the set of mobile devices.

The system 150 then determines substitution factors for the obtained parameters associated with the set of mobile devices, generates a substitution forecast for the set of mobile devices that is based on the substitution factors determined for the obtained parameters associated with the mobile devices, and determines a consensus forecast for the set of mobile devices that is an adjustment of a baseline forecast for demand of the set of mobile devices based on the substitution forecast for the set of mobile devices.

As described herein, the system 150 may be employed in a variety of inventory processes and associated systems For example, the system 150 may provide various information to an advanced planning and optimization (APO) system that provided planning and optimization functionalities for business processes, such as the SCM APO, provided by SAP®.

As another example, the system 150 may provide various information to assortment optimization processes, which are utilized to determine what items in a substation set an entity (e.g., an entity having many retail locations) may stock across their different retail locations.

For example, a carrier may use the system 150 to determine assortments of six different device cases to stock across their retail stores. Using substitution forecasts determined by the system 150, the carrier may modify assortment percentages for the different cases based on the forecasts in order to determine a percentage of satisfied demand for their customers given the modified assortments, and provide the assortments to the different stores based on the assortment determinations. Therefore, the system 150 may provide information that optimizes an assortment of substitutable items across different retail or other locations.

Of course, the system 150 may be implemented for use with other demand or inventory planning processes or systems.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims

I claim:

1. A computerized method of improving accuracy and reducing processing time in forecasting demand for a set of items, comprising:
obtaining, by a computing device, parameters for a set of items;

wherein the obtained parameters include volume information, price information, and perceived value information for each item of the set of items;

determining, by the computing device, substitution factors for the obtained parameters associated with the items within the set of items, wherein determining the substitution factors for the obtained parameters associated with the items within the set of items includes generating a combined substitution factor matrix that is based on a weighted combination of values within one or more matrices;

generating, by the computing device, a substitution forecast for the set of items that is based on the substitution factors determined for the obtained parameters associated with the items; and determining, by the computing device, a consensus forecast for the set of items that is based on a combination of a baseline forecast for the set of items, a forecast adjustment to the baseline forecast based on promotion information for the set of items, and the substitution forecast for the set of items.

2. The computerized method of claim 1, wherein the one or more matrices includes a volume based substitution factor matrix that is based on the volume information for the set of items.

3. The computerized method of claim 2, wherein the set of items includes a first mobile device and multiple substitute mobile devices, wherein a substitute mobile device is a mobile device whose sales affects the substitution set sales of other mobile devices within the set of items, wherein the volume based substitution factor matrix has matrix values of volume based substitution factors, for each of the substitute mobile devices, determined by: (volume amount of the substitute mobile device)/(total volume amount of set of mobile devices–volume amount of first device).

4. The computerized method of claim 1, wherein the one or more matrices includes a perceived value based substitution factor matrix that is based on the perceived value information for the set of items.

5. The computerized method of claim 1, wherein the perceived value information is information indicating a rating of an item with respect to other items within the set of items.

6. The computerized method of claim 1, wherein generating the substitution forecast for the set of items includes applying the combined substitution factor matrix to a determined amount of cannibalized devices for the substitution set.

7. The computerized method of claim 1, the method further comprising adjusting, by the computing device, the baseline forecast based on the promotion information for the set of items.

8. The computerized method of claim 1, wherein the items are one of smart phones, tablet computing devices or mobile device accessories.

9. The computerized method of claim 1, wherein the set of items includes a tier of substitute items that each affect consumer demand of other items within the set of items.

10. At least one non-transitory computer-readable storage medium, carrying instructions, that when executed by at least one data processor cause the data processor to perform a method that improves accuracy and processing time in forecasting demand for a set of items, the method comprising:

obtaining parameters for a set of items;

wherein the obtained parameters include volume information, price information, and perceived value information for each item of the set of items;

determining substitution factors for the obtained parameters associated with the items within the set of items, wherein determining the substitution factors for the obtained parameters associated with the items within the set of items includes generating a combined substitution factor matrix that is based on a weighted combination of values within one or more matrices;

generating a substitution forecast for the set of items that is based on the substitution factors determined for the obtained parameters associated with the items; and determining a consensus forecast for the set of items that is based on a combination of a baseline forecast for the set of items, a forecast adjustment to the baseline forecast based on promotion information for the set of items, and the substitution forecast for the set of items.

11. The at least one non-transitory computer-readable storage medium of claim 10, wherein the one or more matrices includes a volume based substitution factor matrix that is based on the volume information for the set of items.

12. The at least one non-transitory computer-readable storage medium of claim 11, wherein the set of items includes a first mobile device and multiple substitute mobile devices, wherein a substitute mobile device is a mobile device whose sales affects the substitution set sales of other mobile devices within the set of items, wherein the volume based substitution factor matrix has matrix values of volume based substitution factors, for each of the substitute mobile devices, determined by: (volume amount of the substitute mobile device)/(total volume amount of set of mobile devices–volume amount of first device).

13. The at least one non-transitory computer-readable storage medium of claim 10, wherein the one or more matrices includes a perceived value based substitution factor matrix that is based on the perceived value information for the set of items.

14. The at least one non-transitory computer-readable storage medium of claim 10, wherein the perceived value information is information indicating a rating of an item with respect to other items within the set of items.

15. The at least one non-transitory computer-readable storage medium of claim 10, wherein generating the substitution forecast for the set of items includes applying the combined substitution factor matrix to a determined amount of cannibalized devices for the substitution set.

16. The at least one non-transitory computer-readable storage medium of claim 10, wherein the method further comprises adjusting the baseline forecast based on the promotion information for the set of items.

17. A system for improving accuracy and reducing processing time in forecasting demand of a set of items, the system comprising:

at least one hardware computer, wherein the computer is configured to execute software modules, including:

a substitution set module that obtains parameters for a set of items, wherein the obtained parameters include volume information, price information, and perceived value information for each item in the set of items;

one or more matrix modules that determines substitution factors for the obtained parameters associated with the items within the set of items, wherein determining the substitution factors for the obtained parameters associated with the items within the set of items includes generating a combined substitution factor matrix that is based on a weighted combination of values within one or more matrices;
a substitution forecast module that generates a substitution forecast for the set of items that is based on the substitution factors determined for the obtained parameters associated with the items; and
a consensus forecast module that determines a consensus forecast for the set of items that is based on a combination of a baseline forecast for the set of items, a forecast adjustment to the baseline forecast based on promotion information for the set of items, and the substitution forecast for the set of items.

18. The system of claim 17, wherein the software modules further include a volume matrix module that generates a volume based substitution factor matrix that is based on the volume information for the set of items.

19. The system of claim 17, wherein the software modules further include a value matrix module that generates a perceived value based substitution factor matrix that is based on the perceived value information for the set of items.

20. The system of claim 17, wherein the perceived value information is information indicating a rating of a mobile device with respect to other mobile devices within the set of items.

* * * * *